(12) United States Patent
Hayashi et al.

(10) Patent No.: US 9,023,944 B2
(45) Date of Patent: May 5, 2015

(54) PROCESS FOR PRODUCING HYDROGENATED PETROLEUM RESIN

(75) Inventors: Takanori Hayashi, Shunan (JP); Hajime Takasugi, Shunan (JP); Makoto Kashima, Ichihara (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

(21) Appl. No.: 14/116,262

(22) PCT Filed: May 31, 2012

(86) PCT No.: PCT/JP2012/064049
§ 371 (c)(1),
(2), (4) Date: Nov. 7, 2013

(87) PCT Pub. No.: WO2012/165532
PCT Pub. Date: Dec. 6, 2012

(65) Prior Publication Data
US 2014/0148550 A1 May 29, 2014

(30) Foreign Application Priority Data

Jun. 1, 2011 (JP) .................................. 2011-123664

(51) Int. Cl.
| | |
|---|---|
| *C08F 8/04* | (2006.01) |
| *C08F 112/08* | (2006.01) |
| *C08F 240/00* | (2006.01) |
| *C08L 65/00* | (2006.01) |

(52) U.S. Cl.
CPC .................. *C08F 8/04* (2013.01); *C08F 240/00* (2013.01)

(58) Field of Classification Search
CPC ........ C08F 8/04; C08F 112/08; C08F 240/00; C08L 65/00

USPC ................. 525/51, 333.3, 338; 526/283, 346; 524/554
See application file for complete search history.

(56) References Cited

U.S. PATENT DOCUMENTS

| | | |
|---|---|---|
| 5,155,184 A | 10/1992 | Laurent et al. |
| 6,040,388 A | 3/2000 | Nishimura et al. |

(Continued)

FOREIGN PATENT DOCUMENTS

| | | |
|---|---|---|
| CN | 1720272 | 1/2006 |
| CN | 1726231 | 1/2006 |

(Continued)

OTHER PUBLICATIONS

International Search Report Issued Aug. 14, 2012 in PCT/JP12/064049 Filed May 31, 2012.

(Continued)

*Primary Examiner* — Michael M Bernshteyn
(74) *Attorney, Agent, or Firm* — Oblon, McClelland, Maier & Neustadt, L.L.P.

(57) ABSTRACT

A method including measuring a near-infrared absorption spectrum of a hydrogenated compound in the form of a molten resin from which a hydrogenation solvent is separated to calculate an aromatic content ratio and a softening point as physical property values of the hydrogenated compound based on analytical curve data. At least one of a temperature, pressure, reaction time and hydrogen content in a hydrogenating portion is controlled such that a difference between the aromatic content ratio and the bromine number measured in the near-infrared spectrometry and an aromatic content ratio and bromine number of a target hydrogenated petroleum resin pellet becomes small.

13 Claims, 3 Drawing Sheets

(56) References Cited

U.S. PATENT DOCUMENTS

| | | | |
|---|---|---|---|
| 6,307,624 B1 | 10/2001 | Brueck et al. | |
| 2004/0030055 A1 | 2/2004 | Guo | |
| 2006/0063892 A1* | 3/2006 | Yamane | 525/333.3 |
| 2006/0223948 A1* | 10/2006 | Yamane | 525/333.3 |

FOREIGN PATENT DOCUMENTS

| | | |
|---|---|---|
| JP | 61 255918 | 11/1986 |
| JP | 2865755 | 12/1998 |
| JP | 11 130820 | 5/1999 |
| JP | 11 228603 | 8/1999 |
| JP | 2000140619 A * | 5/2000 |
| JP | 2002 145966 | 5/2002 |
| JP | 2002145966 A * | 5/2002 |
| JP | 2003 532762 | 11/2003 |
| JP | 2004026969 A * | 1/2004 |
| JP | 4385433 | 10/2009 |
| WO | 2004 56882 | 7/2004 |
| WO | WO 2004056882 A1 * | 7/2004 |

OTHER PUBLICATIONS

Office Action issued Jan. 26, 2015, in Chinese patent application No. 201280022339.0 (w/English translation).

* cited by examiner

PROCESS FOR PRODUCING HYDROGENATED PETROLEUM RESIN

CROSS REFERENCE TO RELATED APPLICATIONS

The present application is a 35 U.S.C. §371 national stage patent application of International patent application PCT/JP2012/064049, filed on May 31, 2012, published as WO/2012/165532 on Dec. 6, 2012, the text of which is incorporated by reference, and claims the benefit of the filing date of Japanese application no. 2011-123664, filed on Jun. 1, 2011, the text of which is also incorporated by reference.

TECHNICAL FIELD

The present invention relates to a method for producing a hydrogenated petroleum resin.

BACKGROUND ART

Hot-melt adhesives are widely used for manufacturing disposal diapers, binding books and packaging various products. Examples of the material of the hot-melt adhesives include Styrene-Butadiene-Styrene block copolymer (referred to as SBS hereinafter), Styrene-Isoprene-Styrene block copolymer (referred to as SIS hereinafter), Ethylene Vinyl Acetate block copolymer (referred to as EVA hereinafter) and Amorphous PolyAlpha-Olefin (referred to as APAO hereinafter). A tackifier in a form of a hydrogenated petroleum resin is blended in the base polymer.

The hydrogenated petroleum resin is produced by a hydrogenation process for hydrogenating a polymer obtained by adding styrene monomer to cyclopentadiene as disclosed in Patent Literature 1, for instance. The hydrogenated petroleum resin is sometimes provided in a form of hemispherical pellets in view of handleability.

In producing the hydrogenated petroleum resin, a batch processing in which the pelletized hydrogenated petroleum resin is analyzed and polymerization conditions and hydrogenating conditions are adjusted based on the results of the analysis is performed to produce a hydrogenated petroleum resin of predetermined physical properties.

However, in order to produce hydrogenated petroleum resin pellets of desired physical properties, such a batch processing requires repetition of the adjustment of the production conditions based on the results of the analysis of the produced pellet, and, consequently, requires much production time and complicated work. Accordingly, simplification of production management has been desired.

In view of the above, as disclosed in Patent Literatures 2 to 4 for instance, some of known processes employ a near-infrared spectrometer in producing a synthetic resin to measure an absorption spectrum in the resin that is under production for predicting the physical properties of the final products to control the production process.

CITATION LIST

Patent Literature(S)

Non-Patent Literature(S)

Patent Literature 1 WO2004/056882 A
Patent Literature 2 JP-A-2002-145966
Patent Literature 3 Japanese Patent No. 4385433
Patent Literature 4 Japanese Patent No. 2865755

SUMMARY OF THE INVENTION

Problem(S) to be Solved by the Invention

As described above, in order to produce hydrogenated petroleum resin pellets of desired physical properties, the production process may be controlled based on a near-infrared spectrometry as disclosed in Patent Literatures 2 to 4.

However, in order to obtain the hydrogenated petroleum resin of desired physical properties, after the hydrogenation reaction in a hydrogenation solvent, the hydrogenation solvent and low-molecular-weight components have to be removed as needed from the hydrogenated petroleum resin pellets. Thus, it is difficult to appropriately control the production process.

An object of the invention is to provide a production method of a hydrogenated petroleum resin capable of easily producing the hydrogenated petroleum resin.

Means for Solving the Problem(s)

A method for producing a hydrogenated petroleum resin according to an aspect of the invention includes: measuring a near-infrared absorption spectrum of a molten resin from which a hydrogenation solvent is separated; and controlling a process for producing hydrogenated petroleum resin pellets based on a result of the measurement.

In the above aspect of the invention, in controlling the method for producing the hydrogenated petroleum resin pellets, it is preferable that the result of the measurement indicates a physical property value of at least one of an aromatic content ratio and a bromine number of the molten resin, and at least one of a temperature, a pressure, a reaction time and a hydrogen content of a hydrogenation reaction is controlled such that a difference between the physical property value of the molten resin and a physical property value of a target hydrogenated petroleum resin pellet becomes small.

In the above aspect of the invention, in controlling the method for producing the hydrogenated petroleum resin pellets, it is preferable that the result of the measurement indicates a softening point of the molten resin, and at least one of a temperature and a pressure in a step for separating the hydrogenation solvent or a low-molecular-weight component is controlled such that a difference between the softening point of the molten resin and a softening point of a target hydrogenated petroleum resin pellet becomes small.

BRIEF DESCRIPTION OF DRAWING(S)

DESCRIPTION OF EMBODIMENT(S)

As a transfer device of pelletized products of the invention, an exemplary embodiment related to a transfer device of hydrogenated petroleum resin pellets will be described below with reference to the attached drawings.

The pelletized product in a form of hydrogenated petroleum resin pellets will be exemplified in the invention. However, the invention is also applicable to various granular substances and especially to granular substances easily damaged due to collision.

Initially, an arrangement of a production plant provided with the transfer device of the hydrogenated petroleum resin pellets for producing the hydrogenated petroleum resin pellets will be described below.

Arrangement of Production Plant of Hydrogenated Petroleum Resin Pellets

Figure 1:
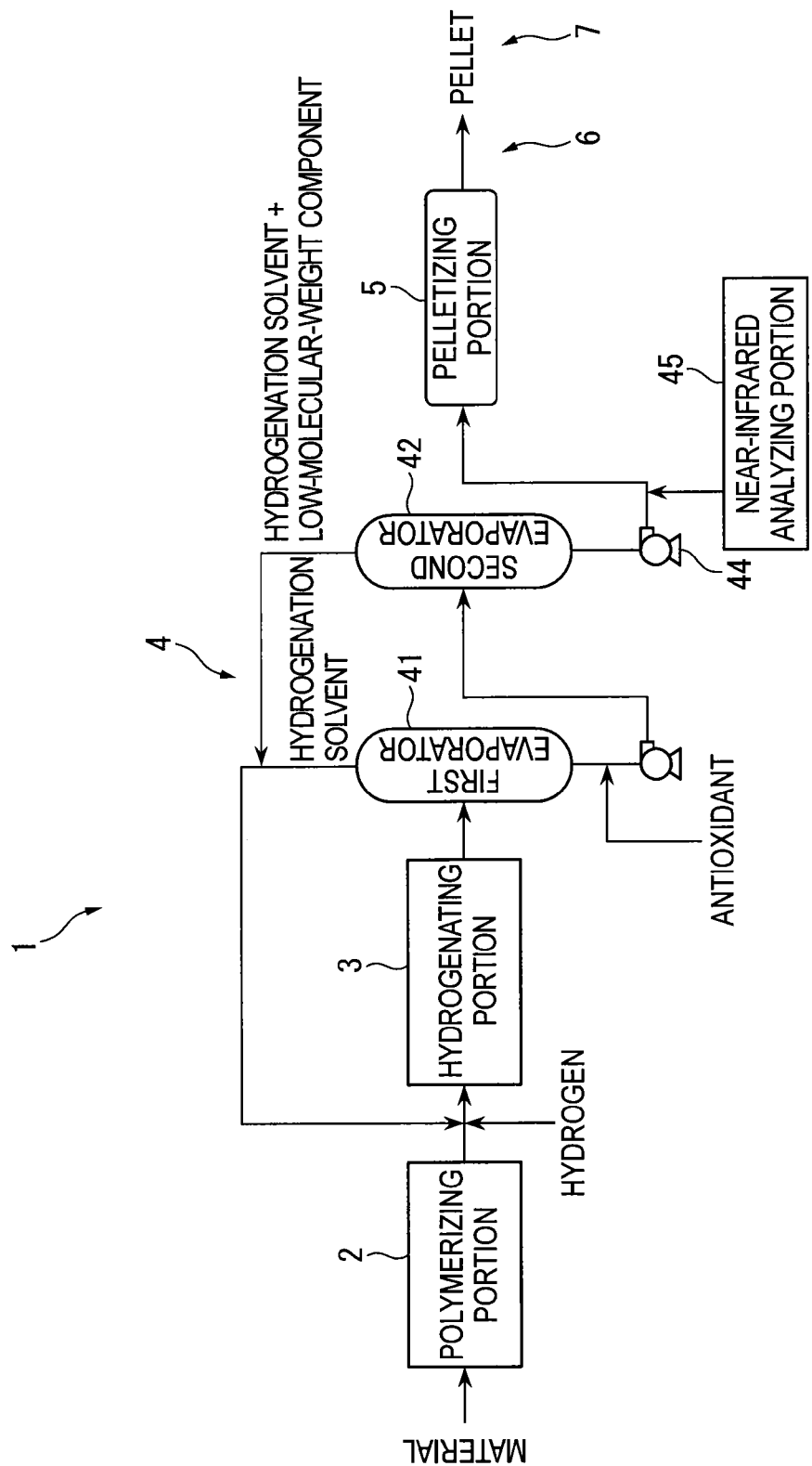
FIG. 1 is a block diagram schematically showing an arrangement of a production plant of hydrogenated petroleum resin pellets used in a production method of a hydrogenated petroleum resin according to an exemplary embodiment of the invention.

As shown in FIG. 1, a production plant 1 for hydrogenated petroleum resin pellets is a plant for producing hydrogenated petroleum resin pellets from a hydrogenated petroleum resin material.

The production plant 1 includes: a polymerizing portion 2; a hydrogenating portion 3; a hydrogenation solvent recovering portion 4; a pelletizing portion 5; a transferring portion 6; a storage portion 7; and a control portion (not shown).

Polymerization Reaction

The polymerizing portion 2 performs a polymerization reaction in which a cyclopentadiene compound and a vinyl aromatic compound are thermally polymerized to produce a copolymer.

The polymerizing portion 2 is provided with, for instance, a polymerization reaction tank in which the hydrogenated petroleum resin materials in a form of the cyclopentadiene compound and the vinyl aromatic compound are thermally polymerized using a solvent.

Examples of the cyclopentadiene compound include cyclopentadiene, methylcyclopentadiene, ethylcyclopentadiene, dimmer thereof and co-dimers thereof.

Examples of the vinyl aromatic compound include styrene, α-methylstyrene and vinyl toluene.

Examples of the solvent include an aromatic solvent, naphthene solvent and aliphatic hydrocarbon solvent. Specifically, benzene, toluene, xylene, cyclohexane, methylcyclohexane, dimethylcyclohexane and ethylcyclohexane are suitably usable. The solvent is recovered as necessary from the polymerization reaction tank to be recycled.

The recovered solvent typically contains a low-molecular-weight component with a molecular weight approximately in a range from 250 to 300.

In order to avoid degradation of the physical properties, the concentration of the low-molecular-weight component is at least set at 4 mass % or less when the solvent is recycled for the thermal polymerization. According to the content of the low-molecular-weight component in the recovered solvent, the low-molecular-weight component is further separately removed or the solvent is diluted with a new solvent so that the concentration of the low-molecular-weight component falls at 4 mass % or below before being used as the polymerization solvent at the start of the polymerization reaction.

The polymerization reaction tank is a reactor for performing the polymerization in a pressurized and heated environment. The polymerization reaction tank includes a stirrer and a heater (both not shown). A first material tank, a second material tank and a solvent tank of the solvent recovering portion are connected to the polymerization reaction tank, whereby the cyclopentadiene compound, the vinyl aromatic compound and the solvent are put into the polymerization reaction tank as needed. The obtained copolymer flows out through the bottom of the polymerization reaction tank to be subjected to the subsequent hydrogenation reaction.

Herein, though the mixture ratio of the cyclopentadiene compound and the vinyl aromatic compound is not particularly limited, a typical ratio (the cyclopentadiene compound: the vinyl aromatic compound) is in a range from 70:30 to 20:80.

Further, the used amount of the polymerization solvent is in a range from 50 to 500 parts by mass relative to 100 parts by mass of a mixture of the monomers.

At the start of the thermal polymerization, it is desirable that the temperature of the solvent is heated to 100 degrees C. or more, preferably 150 degrees C. or more in the polymerization reaction tank. The mixture of the cyclopentadiene compound and the vinyl aromatic compound is added in a divided manner into the heated solvent in the polymerization reaction tank for copolymerization.

The time for adding the mixture in a divided manner is typically in a range from 0.5 to 5 hours. It is desirable that the mixture is added in equal parts. The copolymerization reaction desirably continues after the addition of the mixture of the cyclopentadiene compound and the vinyl aromatic compound is completed. Though the reaction conditions at this time are not specifically limited, the typical reaction temperature is in a range from 150 to 350 degrees C., the typical reaction pressure is in a range from 0 to 2 MPa and the typical reaction time is in a range from 1 to 10 hours.

After the thermal polymerization in the polymerization reaction tank according to the above conditions, a copolymer having a softening point in a range from 60 to 130 degrees C., a content of the vinyl aromatic compound in a range from 30 to 90 mass %, a bromine number in a range from 30 to 90 g/100 g and a number average molecular weight in a range from 400 to 1000 is obtained.

Hydrogenation Reaction

In the hydrogenating portion 3, a hydrogenation reaction for adding hydrogen to the copolymer generated by the thermal polymerization in the polymerizing portion 2 to obtain a hydrogenated product is performed.

The hydrogenating portion 3 includes a plurality of hydrogenation reactors for performing the hydrogenation reaction for adding hydrogen to the copolymer generated by the thermal polymerization in the polymerizing portion 2 under the presence of the hydrogenation solvent, and the like.

Examples of the hydrogenation solvent are cyclohexane, methylcyclohexane, dimethylcyclohexane, ethylcyclohexane and tetrahydrofuran.

A hydrogenation catalyst is fed in each of the hydrogenation reactors. The hydrogenation reactors may be used in multiple stages. A nickel catalyst, palladium catalyst, cobalt catalyst, platinum catalyst, rhodium catalyst and the like are used for the hydrogenation catalyst. Under the presence of the hydrogenation catalyst, hydrogen and the copolymer are subjected to a hydrogenation reaction at a temperature in a range from 120 to 300 degrees C. and a reaction pressure in a range from 1 to 6 MPa and for a reaction time in a range from 1 to 7 hours.

A hydrogenated product having a softening point in a range from 70 to 140 degrees C., a content of the vinyl aromatic compound in a range from 0 to 35 mass %, a bromine number in a range from 0 to 30 g/100 g and a number average molecular weight in a range from 400 to 1000 is obtained according to the above hydrogenation conditions.

In the hydrogenating portion 3, gas phase component including unreacted hydrogen is separated to be recovered after the hydrogenation by the hydrogenation reactors and is subjected to a process outside the system.

Hydrogenation Solvent Removal

The hydrogenation solvent recovering portion 4 separates and removes the hydrogenation solvent from the hydrogenated product. The hydrogenation solvent recovering portion 4 includes a solvent evaporation tank 41 (first evaporator), a thin-film evaporator 42 (second evaporator) and the like.

The solvent evaporation tank 41 is connected to the hydrogenating portion 3. The solvent evaporation tank 41 separates and recovers the hydrogenation solvent by evaporation from the hydrogenated product obtained in the hydrogenating portion 3. The evaporated hydrogenation solvent is separately recovered and is recycled as the hydrogenation solvent used during the hydrogenation reaction in the hydrogenating portion 3.

The thin-film evaporator 42 is connected to the solvent evaporation tank 41. The thin-film evaporator 42 separates and recovers the hydrogenation solvent remained in the hydrogenated product by evaporation. The evaporated hydrogenation solvent and the low-molecular-weight component are separately recovered and are recycled as a hydrogenation solvent used during the hydrogenation reaction in the hydrogenating portion 3 according to the values of the physical properties of the hydrogenated petroleum resin pellets to be produced (target hydrogenated petroleum resin).

An adding portion for adding an antioxidant is provided between the solvent evaporation tank 41 and the thin-film evaporator 42 of the hydrogenation solvent recovering portion 4.

The adding portion of the antioxidant adds an antioxidant to the hydrogenated product from which most of the hydrogenation solvent is removed in the solvent evaporation tank 41.

The hydrogenation solvent separated and recovered in the evaporation process in the downstream thin-film evaporator 42 from the hydrogenation solvent remained together with the solvent in which the antioxidant is dissolved can be recycled for the hydrogenation reaction so that the hydrogenation reaction is not influenced thereby.

The solvent in which the antioxidant is dissolved is separated and recovered from the hydrogenated product together with the hydrogenation solvent by the downstream thin-film evaporator 42.

A near-infrared analyzing portion 45 for measuring physical properties of the molten resin (the hydrogenated product before being pelletized: i.e. hydrogenated petroleum resin from which the hydrogenation solvent and the low-molecular-weight component are removed) is provided between the hydrogenation solvent recovering portion 4 and the downstream pelletizing portion 5.

The near-infrared analyzing portion 45 measures using near-infrared light the physical properties of the molten hydrogenated petroleum resin to be supplied to the pelletizing portion 5 by a supply pump 44. Specifically, the near-infrared analyzing portion 45 includes a light-transmissive pipe in which the molten resin flows, a spectrum detecting portion that irradiates the near-infrared light to the molten resin flowing in the light-transmissive pipe to detect the near-infrared absorption spectrum, and a calculating portion that calculates the physical properties of the molten resin based on a near-infrared absorption spectrum detected by the spectrum detecting portion with reference to an analytical curve database.

Herein, the analytical curve database stores analytical curve data based on the measurement of the near-infrared absorption spectrum of the produced various hydrogenated petroleum resin pellets and actual measurement results of the physical properties of the hydrogenated petroleum resin pellets.

Figure 2:
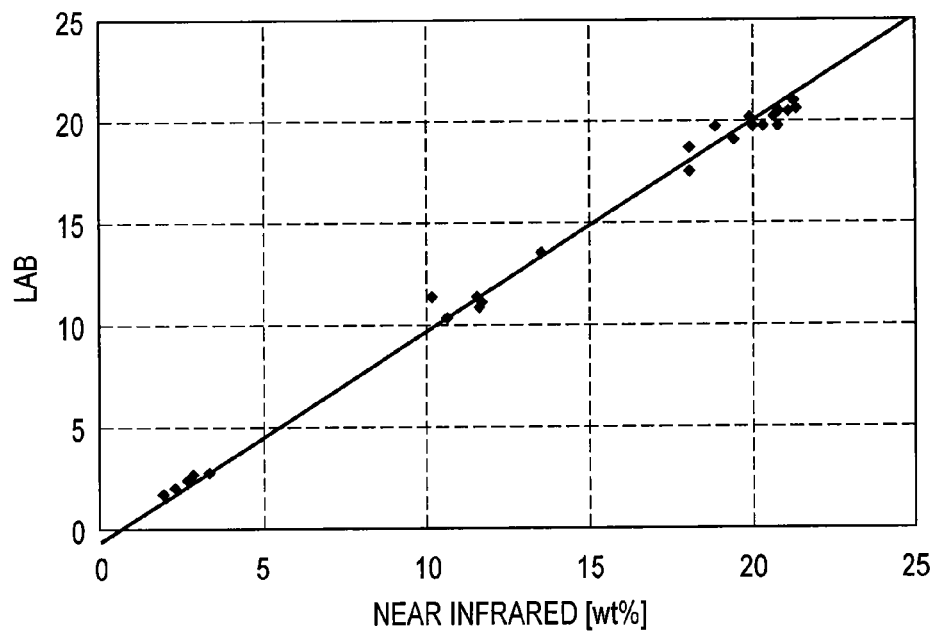
FIG. 2 is a graph showing analytical curve data relating to an aromatic content ratio stored in an analytical curve database in a near-infrared analyzing portion of the production plant of the hydrogenated petroleum resin pellets.
Figure 3:
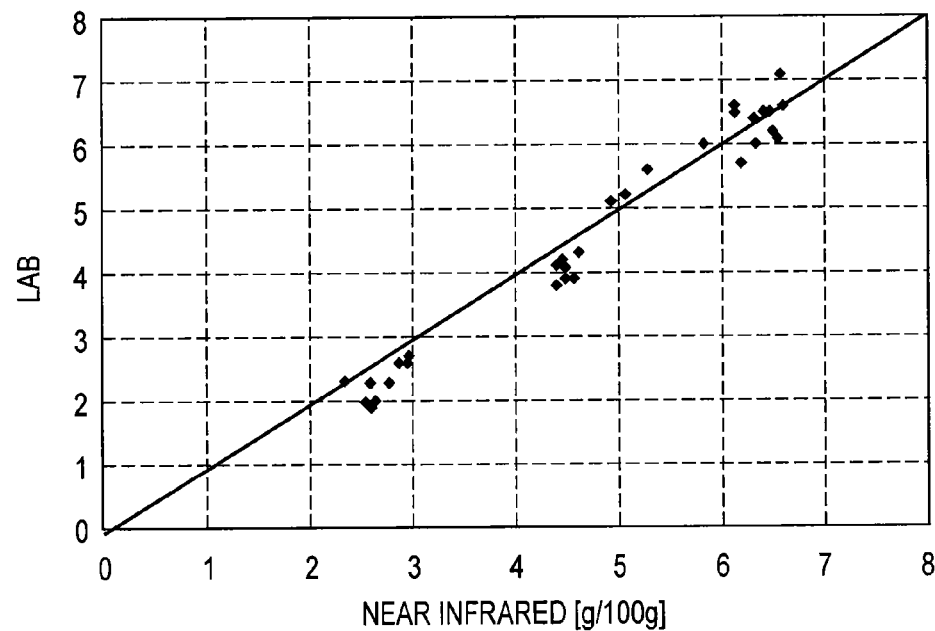
FIG. 3 is a graph showing analytical curve data relating to a bromine number stored in the analytical curve database in the near-infrared analyzing portion.
Figure 4:
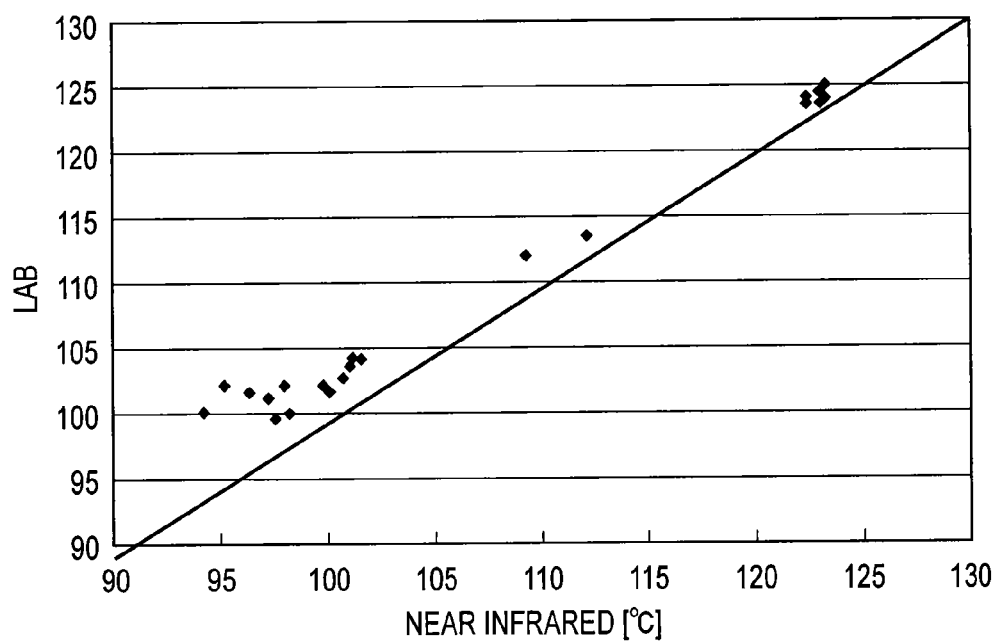
FIG. 4 is a graph showing analytical curve data relating to a softening point stored in the analytical curve database in the near-infrared analyzing portion.

The analytical curve data includes, for instance, analytical curve data of an aromatic content ratio of the molten resin as shown in a graph in FIG. 2, analytical curve data of a bromine number of the molten resin as shown in a graph in FIG. 3 and analytical curve data of a softening point of the produced hydrogenated petroleum resin pellets as shown in a graph in FIG. 4.

These analytical curves are obtained based on the measurement results represented by the dots in FIGS. 2 to 4 showing measurement results of the aromatic content ratio, bromine number and softening point of the previously produced various hydrogenated petroleum resin pellets. These analytical curves are calculated according to typically used various calculation methods.

The calculating portion calculates the physical properties (i.e. the aromatic content ratio, bromine number and softening point of the hydrogenated compound) of the measured molten resin from the measurement results of the near-infrared absorption spectrum of the hydrogenated product detected by the spectrum detecting portion with reference to the analytical curve data in the analytical curve database.

Then, the calculating portion sends the detected physical properties of the hydrogenated petroleum resin pellets to the control portion to control the operation conditions of the production plant 1 so that the hydrogenated petroleum resin pellets under production exhibit desired physical properties.

Pelletizing

The pelletizing portion 5 pelletize the molten resin (i.e. the hydrogenated product from which the hydrogenation solvent is removed and to which the antioxidant is added) into hemispherical hydrogenated petroleum resin pellets. The pelletizing portion 5 includes a pelletizer, a pellet-air-cooling unit (both not shown) and the like.

In the pelletizer, the molten resin is, for instance, dropped onto a cooling conveyor to produce hemispherical hydrogenated petroleum resin pellets. The produced hydrogenated petroleum resin pellets are scraped off from the surface of the cooling conveyor to be supplied to the transferring portion 6 for transferring the pellets to the storage portion 7.

Transfer

The transferring portion 6 transfers the hydrogenated petroleum resin pellets produced in the pelletizing portion 5 to the storage portion 7.

The transferring portion 6 includes a chute connected to the pelletizing portion 5, a transfer conveyor, a bucket conveyor and the like. The transferring portion 6 transfers the hydrogenated petroleum resin pellets.

It should be understood that the transferring portion 6 is not necessarily constructed as described above but various transfer devices and structures can be used for the transferring portion 6. However, since the hydrogenated petroleum resin pellets are relatively brittle, it is preferable that the transferring portion 6 is constructed so that the hydrogenated petroleum resin pellets are not damaged due to impacts during the transfer.

Storage

The storage portion 7 stores the hydrogenated petroleum resin pellets transferred by the transferring portion 6 in a manner so that the pellets are capable of being taken out.

The storage portion 7 includes storage hopper(s) (not shown) and a switching portion (not shown) for loading the hydrogenated petroleum resin pellets transferred by the bucket conveyor of the transferring portion 6 to a predetermined one of the storage hopper(s).

Control

The control portion controls the entire process of the production plant 1. The control portion includes a memory unit for storing various programs and database and an arithmetic unit for running the program to perform various calculations in order to control the entire process of the production plant 1. Specifically, the control unit controls: a temperature, a pressure and a reaction time in the polymerization reaction in the polymerizing portion 2 and the hydrogenation reaction in the hydrogenating portion 3; the recovery of the hydrogenation solvent in the hydrogenation solvent recovering portion 4; the addition of the antioxidant in the adding portion of the antioxidant; the pelletization of the hydrogenated petroleum resin pellets in the pelletizing portion 5; the transferring operation and intake/discharge of air by the transferring portion 6; operation conditions of various valves, blowers and pumps; and the like.

Further, the control portion compares the property values of the hydrogenated compound under production sent from the calculating portion of the near-infrared analyzing portion 45 with physical property values of the target hydrogenated petroleum resin pellets. Then, the control portion controls the operating condition of the production plant 1 so that the property of the hydrogenated compound become equal to the target physical properties of the hydrogenated petroleum resin pellets. Specifically, the control portion changes at least one of hydrogenation reaction conditions including the temperature, pressure, reaction time and hydrogen content in accordance with a difference between the measured aromatic content ratio and a target aromatic content ratio and a difference between the measured bromine number and a target bromine number. Further, the control portion changes at least one of operation conditions including the temperature and pressure in the thin-film evaporator 42 in the hydrogenation solvent removing step for separating the hydrogenation solvent or the low-molecular-weight component in accordance with a difference between the measured softening point and a target softening point.

Advantage(s) of Embodiment(s)

As described above, in the above exemplary embodiment, the near-infrared absorption spectrum of the hydrogenated compound (hydrogenated petroleum resin) in a form of the molten resin from which the hydrogenation solvent is separated in the hydrogenation solvent removing step is measured to calculate the physical property values of the hydrogenated compound based on the analytical curve data, and a series of processes for producing the hydrogenated petroleum resin pellets is controlled based on the obtained physical property values.

Accordingly, the physical properties of the hydrogenated petroleum resin under production can be automatically detected without requiring an analysis outside the production plant and the operation can be controlled based on the automatically detected physical properties. Thus, the hydrogenated petroleum resin of desired physical properties can be easily produced.

Further, in the above exemplary embodiment, at least one of the temperature, pressure, reaction time and hydrogen content of the hydrogenation reaction that affect the aromatic content ratio and the bromine number is controlled so that the difference between the physical property value of at least one of the aromatic content ratio and the bromine number shown by the measurement results of the measured near-infrared absorption spectrum and the physical property values of the target hydrogenated petroleum resin pellets becomes small.

Thus, a hydrogenated petroleum resin of desired physical properties can be easily produced.

Further, in the above exemplary embodiment, at least one of the temperature and pressure in the step for separating the hydrogenation solvent or the low-molecular-weight component that affect the softening point is controlled so that the difference between the softening point indicated by the measurement results of the measured near-infrared absorption spectrum and the softening point of the target hydrogenated petroleum resin pellets becomes small.

Thus, a hydrogenated petroleum resin of desired physical properties can be easily produced.

Modification(s)

Incidentally, it should be understood that the scope of the present invention is not limited to the above-described exemplary embodiment(s) but includes modifications and improvements as long as the modifications and improvements are compatible with the invention.

Specifically, it is not necessary for the control portion to control the operation conditions of the production plant by a computer program and the like. For instance, the control portion may notify a worker to control the operation conditions of the production plant based on the measurement results and the worker may change the operation conditions based on the notified results.

In the above exemplary embodiment, though the aromatic content ratio, bromine number and softening point are respectively measured to control the operation conditions in the hydrogenation reaction step and the hydrogenation solvent removing step, only one or two of the physical property values of the aromatic content ratio, bromine number and softening point may be measured. In controlling the operation conditions of the hydrogenation reaction step based on the aromatic content ratio or bromine number, all of the temperature, pressure, reaction time and hydrogen content in the hydrogenation are not necessarily controlled but at least one of the operation conditions including the temperature, pressure, reaction time and hydrogen content is necessary to be measured. Similarly, in controlling the operation conditions of the hydrogenation solvent removal step based on the softening point, both of the temperature and pressure in the thin-film evaporator 42 are not necessarily controlled but at least one of the operation conditions of the temperature and pressure is necessary to be measured.

Further, though the hydrogenation reaction step is exemplarily performed in two stages (i.e. the solvent evaporation tank 41 and the thin-film evaporator 42), the hydrogenation solvent and the low-molecular-weight component may be separated in a single stage or in three or more stages. In such an arrangement, at least one of the pressure and temperature in the step for separating the low-molecular-weight component that especially affects the softening point only needs to be controlled.

Other specific structure and process in implementing the invention may be altered otherwise as long as the structure and the process are compatible with the invention.

The invention claimed is:

1. A method for producing a hydrogenated petroleum resin, comprising:
  thermally polymerizing a cyclopentadiene compound and a vinyl aromatic compound to obtain a copolymer;
  adding hydrogen to the copolymer to obtain a hydrogenated product;
  separating a hydrogenation solvent from the hydrogenated product using a first evaporator;

separating, using a second evaporator, a remaining amount of the hydrogenation solvent and a low molecular weight component from the hydrogenated product from which the hydrogenated solvent is separated by the first evaporator;

providing an analytical curve database that stores analytical curve data and a calculating portion that measures physical properties based on the analytical curve data;

measuring a near-infrared absorption spectrum of a molten resin from which the hydrogenation solvent and the low molecular weight component are separated;

calculating the physical properties of the molten resin based on a measurement result of the near-infrared absorption spectrum and the analytical curve data, thereby calculating a difference between the calculated physical properties and preset target physical properties of the hydrogenated petroleum resin to be produced; and controlling a reaction condition for hydrogenating the molten resin comprising at least one of a temperature, pressure, reaction time and amount of the hydrogen to reduce the difference between the calculated physical properties of the molten resin and the preset target physical properties of the hydrogenated petroleum resin.

2. The method of claim 1, wherein in the controlling the result of the measurement indicates a physical property value of at least one of an aromatic content ratio and a bromine number of the molten resin, and wherein, in the controlling, at least one of temperature, pressure, reaction time and hydrogen content in hydrogenating the molten resin is controlled so that the physical property value of the molten resin and a physical property value of a target hydrogenated petroleum resin pellet approach each other.

3. The method of claim 1, wherein in the controlling, the result of the measurement indicates a softening point of the molten resin, and in the separating in the first and the second evaporator, the temperature, the pressure, or both, are controlled so that the softening point of the molten resin and a softening point of a target hydrogenated petroleum resin pellet approach each other.

4. The method of claim 2, wherein the result of the measurement indicates the physical property value of the aromatic content ratio.

5. The method of claim 2, wherein the result of the measurement indicates the physical property value of the bromine number of the molten resin.

6. The method of claim 2, wherein the result of the measurement indicates both the physical property values of the aromatic content ratio and the bromine number of the molten resin.

7. The method of claim 2, wherein the controlling comprises adjusting the temperature of the hydrogenation reaction to reduce the difference between the physical property value of the molten resin and the physical property value of the target hydrogenated petroleum resin pellet.

8. The method of claim 2, wherein the controlling comprises adjusting the pressure of the hydrogenation reaction to reduce the difference between the physical property value of the molten resin and the physical property value of the target hydrogenated petroleum resin pellet.

9. The method of claim 2, wherein the controlling comprises adjusting the reaction time of the hydrogenation reaction to reduce the difference between the physical property value of the molten resin and the physical property value of the target hydrogenated petroleum resin pellet.

10. The method of claim 2, wherein the controlling comprises adjusting the hydrogen content of the hydrogenation reaction to reduce the difference between the physical property value of the molten resin and the physical property value of the target hydrogenated petroleum resin pellet.

11. The method of claim 3, wherein in the separating in the first and the second evaporator, the temperature is controlled.

12. The method of claim 3, wherein in the separating in the first and the second evaporator, the pressure is controlled.

13. The method of claim 3, wherein in the separating in the first and the second evaporator, both the temperature and the pressure are controlled.

* * * * *